W. F. HARRIS.
LOCK NUT.
APPLICATION FILED AUG. 18, 1908.
909,788.
Patented Jan. 12, 1909.
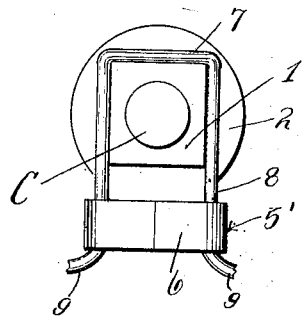
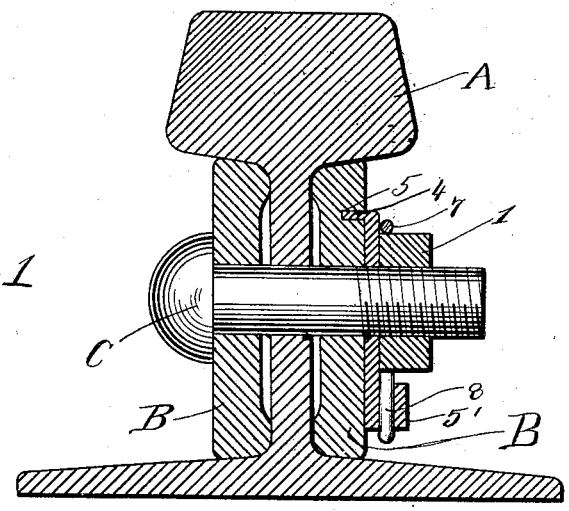
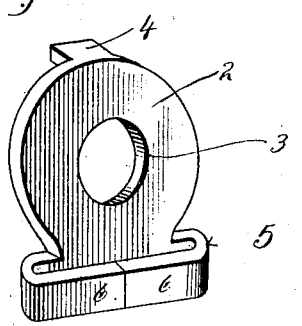
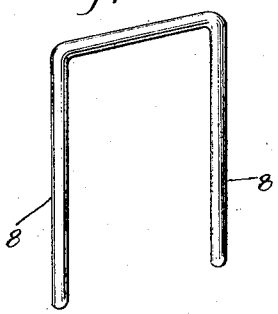
Witnesses
Alan F. Garner
C. Bradway.
Inventor
William F. Harris
By Victor J. Evans
Attorney

UNITED STATES PATENT OFFICE.

WILLIAM F. HARRIS, OF LAKENAN, MISSOURI, ASSIGNOR OF ONE-FOURTH TO OMER M. RHODES, OF LAKENAN, MISSOURI.

LOCK-NUT.

No. 909,788.   Specification of Letters Patent.   Patented Jan. 12, 1909.

Application filed August 18, 1908. Serial No. 449,164.

*To all whom it may concern:*

Be it known that I, WILLIAM F. HARRIS, a citizen of the United States, residing at Lakenan, in the county of Shelby and State of Missouri, have invented new and useful Improvements in Lock-Nuts, of which the following is a specification.

This invention relates to nut locks of that type which can be applied to nuts of standard form so as to prevent the nuts from jarring loose.

The invention has for one of its objects to provide a device of this character which is of extremely simple and inexpensive construction, and readily applied and reliable in use.

Another object of the invention is the provision of a nut lock consisting of a washer having means for clamping it to the parts to be fastened together by the bolt and nut in combination with a key arranged to embrace the nut and to be fastened to the washer so as to prevent turning of the nut with respect to the bolt.

With these objects in view and others, as will appear as the description proceeds, the invention comprises the various novel features of construction and arrangement of parts which will be more fully described hereinafter and set forth with particularity in the appended claim.

In the accompanying drawing which illustrates one of the embodiments of the invention:—Figure 1 is a transverse section of a railroad rail taken through the joint thereof and illustrating the improved nut lock applied to the bolt. Fig. 2 is a plan view of the nut lock. Figs. 3 and 4 are perspective views of the retaining device or washer and key respectively.

Similar reference characters are employed to designate corresponding parts in the several figures.

In the present instance I have elected to illustrate the invention as applied to a railroad rail but it is to be understood that it can be used in other connections.

Referring to the drawing, A designates a standard rail and B the fish plates for securing two adjacent sections of the rail together and the fish plates are secured to the rail sections by bolts C to one of which is applied the nut locking device. This device consists of an annular member or washer 2 having a central opening 3 for receiving the threaded shank of the bolt C.

Formed on the washer adjacent to the periphery thereof is a laterally extending lug 4 which is adapted to enter an opening 5 formed in one of the fish plates for preventing the washer from turning on the bolt and at a point opposite from the lug is an outwardly extending loop 5′ formed by tangentially disposed lugs 6 that are bent outwardly from opposite sides of the lower portion of the washer and then inwardly and meet whereby an elongated loop is formed.

Coöperating with the washer 2 is an inverted U-shaped key 7 formed of wire of suitable gage and so proportioned as to engage around three sides of a nut 1, the side members 8 of the key being of such length as to enter the loop 5′ of the washer and project out of the latter so that the extremities 9 can be spread outwardly as shown in Fig. 2 to hold the key in place. In case it is desired to remove the nut, the members 8 of the key are swung inwardly and while held in this position the key is pulled out of the loop 5′ of the washer. The nut is then free to turn for permitting the members to be unbolted. Since the washer can not turn on the bolt, the key will be held in fixed position and prevent the nut from turning.

From the foregoing description taken in connection with the accompanying drawing, the advantages of the construction and of the method of operation will be readily apparent to those skilled in the art to which the invention appertains and while I have described the principle of operation of the invention, together with the device which I now consider to be the best embodiment thereof, I desire to have it understood that the device shown is merely illustrative and that such changes may be made when desired as are within the scope of the claim appended hereto.

I claim:—

The combination of a threaded member, a nut thereon, a washer on the member against which the nut bears, a lug projecting from the rear side of the washer, a pair of oppositely-disposed members arranged in tangential relation on the washer and bent outwardly and backwardly toward each other to form a loop arranged at one side of the nut, a U-shaped key embracing the nut and having its side members extending through the loop with their extremities bent outwardly for retaining the key in place.

In testimony whereof I affix my signature in presence of two witnesses.

WILLIAM F. HARRIS.

Witnesses:
C. B. MARTIN,
N. E. WILLIAMS.